United States Patent Office 3,563,935
Patented Feb. 16, 1971

3,563,935
MOLDING COMPOUNDS ON A BASIS OF PLASTICIZED POLYVINYL CHLORIDE OR VINYL CHLORIDE COPOLYMERS
Rolf Beckmann, Siegburg, Gerhard Bier and Heinz Diessel, Troisdorf, and Hans-Ewald Konermann, Oberlar, Germany, assignors to Dynamit Nobel Aktiengesellschaft, a corporation of Germany
No Drawing. Filed June 13, 1967, Ser. No. 645,632
Claims priority, application Germany, June 18, 1966, D 50,341
Int. Cl. C08f 29/24, 45/40
U.S. Cl. 260—31.8                                 8 Claims

ABSTRACT OF THE DISCLOSURE

Molding compounds on a basis of plasticized polyvinyl chloride or vinyl chloride copolymers are disclosed which comprise from 40 to 75 weight percent of tactic polyvinyl chloride or tactic vinyl chloride copolymers having a comonomer percentage of 0.5 to 20% by weight and with 55 to 80% of their chlorine atoms in a syndiotactic arrangement, from 20 to 50 weight percent and preferably 25 to 40 weight percent of diisotridecyl phthalate as plasticizer, and from 5 to 50 weight percent and preferably 15 to 30 weight percent of a chlorine compound whose chlorine content exceeds that of the polyvinyl chloride or of the vinyl chloride copolymer, and preferably having a chlorine content of 57 to 73 weight percent.

---

This invention relates to plasticized polymers and copolymers of vinyl chloride and more particularly relates to plasticized polyvinyl chloride or vinyl chloride copolymers characterized by their excellent thermal stability.

It is in the prior art to prepare plasticized polymers or copolymers of vinyl chloride characterized by their improved thermal stability of shape by using tactic vinyl chloride polymers or copolymers in place of the customary atactic type. Since these polymers are used also at relatively high temperatures because of their excellent thermal stability of shape, those plasticizers are particularly suited for use in connection therewith which are characterized by a low volatility and a low vapor pressure and in particular, there are suitable the phthalic esters of alcohols having at least ten carbon atoms or the highly polymerized plasticizers.

Because of the special structure of the tactic polymers, with their relatively strong intramolecular bonds as compared with atactic vinyl chloride polymers, they have an adverse influence on the effectiveness of the plasticizers. As a result, an especially careful mixing in of the plasticizers is necessary, since otherwise there is the danger that the plasticizer might sweat out of the plasticized compound. Diisotridecyl phthalate, a plasticizer which is especially interesting because of its low volatility and is often used for the plasticizing of polyvinyl chloride or vinyl chloride copolymers, sweats out of a plasticized tactic vinyl chloride polymer at a mere 70° C., no matter how carefully it is worked in.

In accordance with the invention, molding compounds on a basis of plasticized polyvinyl chloride or vinyl chloride copolymers, are provided consisting of from 40 to 75 weight percent of tactic polyvinyl chloride or tactic vinyl chloride copolymers having a comonomer percentage of 0.5 to 20% by weight, 55 to 80% of the chlorine atoms thereof being in a syndiotactic arrangement, from 20 to 50 weight percent and preferably 25 to 40 weight percent of diisotridecyl phthalate as plasticizer, and from 5 to 50 weight percent, and preferably 15 to 30 weight percent, of a chlorine compound the chlorine content of which exceeds that of the polyvinyl chloride or of the vinyl chloride copolymer and preferably having a chlorine content of 57 to 73 weight percent. The chlorine compound used herein is most advantageously selected from post-chlorinated atactic and/or tactic polyvinyl chloride or atactic and/or tactic post-chlorinated vinyl chloride copolymer. In said post-chlorinated copolymers comonomers are the same as described below.

The tactic vinyl chloride polymers or copolymers can be manufactured according to British Pat. 931,629.

The following are instances of materials which can be used as comonomers in the preparation of the vinyl chloride copolymers: vinyl acetate, vinyl propionate, vinyl stearate, vinylidene chloride, maleic ester, fumaric ester, acrylic ester, itaconic ester, dichlorethylene, trichlorethylene, ethylene, propylene and the like.

Surprisingly, it has been found that the compatibility of diisotridecyl phthalate with tactic polyvinyl chloride or tactic vinyl chloride copolymers is substantially improved by the addition of the chlorine compounds of the invention.

The following examples are given to illustrate the invention and are not to be construed as a limitation thereof.

The molding compounds were manufactured and made into molded objects as follows:

Tactic polyvinyl chloride or tactic vinyl chloride copolymer was mixed together with the chlorine compound, stabilizers and lubricants and plasticized with the plasticizing agent on the roller mixer at temperatures between 180 and 230° C. The roll temperature was regulated according to the nature and the molecular weight of the vinyl chloride polymer and by the chlorine compound that was used. After a milling time of from 20 to 30 minutes, during which the sheet was continually turned, a sufficient amount of the material for the production of a sheet 1 mm. thick was placed in a mold, and this mold was heated to a pressing temperature corresponding to the rolling temperature. After the pressing temperature had been reached, the full press pressure was applied, and then the mold was immediately cooled for the removal of the sheet. A series of tests as hereinafter set out were carried out on the sheets.

The tests were carried out with different chlorine compounds on the basis of the following basic formula:

$x$ parts by weight of tactic vinyl chloride polymer
$y$ parts by weight of a chlorine compound
$z$ parts by weight of a diisotridecyl phthalate and additionally 0.5–31 parts by weight of epoxidized soybean oil [1]
0.5–31 parts by weight of a barium-cadmium stabilizer. [1]

[1] Relating to 100 parts of weight of $x+y+z$.

Said additives, which are a plasticising stabilizer system, may be substituted by other additives, for example, by the same amounts of lead compounds or organic tin compounds. As tactic PVC and copolymers of PVC can be employed such having K values of 55 to 99 and preferably of 55 to 75 and Vicat temperatures of 80° C. to 100° C. Postchlorinated atactic and/or tactic vinyl chloride and copolymers used herein have K values of 50 to 90 and Vicat temperatures of 85° C. to 150° C. and preferably of 100° C. to 130° C.

Test procedures: The sweating of the plasticizer was determined by measuring the weight loss after storage in air for 11 days at 90° C. The specimens were then wiped off, washed with a soap solution and dried at room temperature.

EXAMPLE 1

The tactic vinyl chloride polymer was a homopolymer having a K value of 70 and a Vicat temperature of 95° C.

28 parts by weight of diisotridecyl phthalate were used.

The results obtained with mixtures containing post-chlorinated atactic polyvinyl chloride (chlorine content 68 weight percent, K value 65, Vicat temperature 122° C.) are set out in Table 1. In Table 2 the results of the measurements obtained with mixtures containing post-chlorinated tactic polyvinyl chloride (chlorine content 66 weight percent, K value 70, Vicat temperature 127° C.) are set out.

TABLE 1

| x:y | Weight loss in 11 days, 90° C. percent | Tensile strength, kp./cm.² | Elongation, percent | Shore Hardness A, per DIN 53505 |
|---|---|---|---|---|
| 100:0 | 5.3 | 220 | 240 | 96 |
| 95:5 | 2.4 | 225 | 250 | 95 |
| 90:10 | 1.8 | 210 | 220 | 96 |
| 80:20 | 0.9 | 200 | 210 | 96 |
| 70:30 | 0.7 | 210 | 220 | 96 |

TABLE 2

| x:y | Weight loss in 11 days, 90° C. percent | Tensile strength, kp./cm.² | Elongation, percent | Shore Hardness A, per DIN 53505 |
|---|---|---|---|---|
| 100:0 | 5.3 | 220 | 240 | 96 |
| 95:5 | 2.7 | 215 | 250 | 96 |
| 90:10 | 2.3 | 230 | 230 | 96 |
| 80:20 | 0.7 | 215 | 240 | 96 |
| 70:30 | 0.6 | 215 | 240 | 96 |

The tensile strength, elongation and Shore hardness remain substantially unaffected by the addition of post-chlorinated atactic and post-chlorinated tactic vinyl chloride polymer. The thermal stability of shape, which was determined by the pressure deformation and the residual pressure deformation on samples 10 mm. thick after one hour of loading at 10 kp./cm.² followed by one hour at no load, was also little affected, as it is apparent from Tables 3 and 4.

TABLE 3

| | Pressure deformation percent | | | Residual pressure deformation percent | | |
|---|---|---|---|---|---|---|
| x:y | 20° C. | 40° C. | 60° C. | 80° C. | 100° C. | 120° C. |
| 100:0 | 1.0/0.5 | 2.5/1.0 | 9.0/2.5 | 17.0/2.0 | 27.0/4.5 | 43.0/5.5 |
| 95:5 | 1.5/0.5 | 3.0/1.0 | 9.0/2.5 | 18.0/3.5 | 25.0/4.0 | 36.0/6.5 |
| 90:10 | 1.5/0.5 | 3.0/1.0 | 9.0/2.5 | 18.5/3.0 | 27.5/5.0 | 41.5/8.5 |
| 80:20 | 1.5/0.5 | 2.5/1.0 | 9.0/2.5 | 20.5/3.5 | 33.5/6.0 | 42.0/8.0 |
| 70:30 | 1.5/0.5 | 3.0/1.0 | 9.0/2.5 | 20.0/3.5 | 31.0/6.0 | 41.5/8.5 |

TABLE 4

| | Pressure deformation percent | | | Residual pressure deformation percent | | |
|---|---|---|---|---|---|---|
| x:y | 20° C. | 40° C. | 60° C. | 80° C. | 100° C. | 120° C. |
| 100:0 | 1.0/0.5 | 2.5/1.0 | 9.0/2.5 | 17.0/2.0 | 27.0/4.5 | 43.0/5.5 |
| 95:5 | 1.0/0.5 | 3.0/1.0 | 9.0/2.0 | 19.0/2.5 | 25.0/3.5 | 37.0/5.5 |
| 90:10 | 1.0/0.5 | 3.0/1.0 | 10.5/3.0 | 20.5/3.0 | 26.5/3.5 | 45.0/7.0 |
| 80:20 | 1.5/0.5 | 3.0/1.0 | 9.0/2.5 | 18.5/2.0 | 32.0/6.0 | 45.5/10.0 |
| 70:30 | 1.0/0.5 | 3.0/1.0 | 9.5/3.0 | 19.0/2.0 | 31.5/5.5 | 45.0/9.5 |

For the purpose of comparison with the abovedescribed formulations containing tactic vinyl chloride polymers, the characteristics are shown in Table 5 for a corresponding mixture consisting of:

70 parts by weight of atactic vinyl chloride polymer (K value 70, Vicat temperature 85° C.)
30 parts by weight of diisotridecyl phthalate
2 parts by weight of epoxidized soybean oil
2 parts by weight of a barium-cadmium stabilizer.

TABLE 5

| | |
|---|---|
| Weight loss after 11 days, 90° C., percent | 0.5 |
| Tensile strength, kp./cm.² | 250 |
| Elongation, percent | 240 |
| Shore hardness A per DIN 53505 | 95 |

Pressure def./residual pressure def.:

| | Percent/Percent |
|---|---|
| At 20° C. | 2.0/ 0.5 |
| At 40° C. | 9.5/ 2.5 |
| At 60° C. | 20.0/ 3.5 |
| At 80° C. | 28.5/ 5.0 |
| At 100° C. | 39.5/ 8.0 |
| At 120° C. | 52.5/14.0 |

EXAMPLE 2

The tactic vinyl chloride polymer was, as in Example 1, a homopolymer having a K value of 70 and a Vicat temperature of 95° C. In this case, however, 40 parts by weight of diisotridecyl phthalate were added. The results obtained using mixtures containing post-chlorinated atactic polyvinyl chloride (chlorine content 68 weight percent, K value 65, Vicat temperature 122° C.), are summarized in Table 6.

TABLE 6

| x:y | Weight loss in 11 days, 90° C. percent | Tensile strength, kp./cm.² | Elongation, percent | Shore Hardness A, per DIN 53505 |
|---|---|---|---|---|
| 100:0 | 6.7 | 190 | 290 | 87 |
| 95:5 | 5.1 | 185 | 290 | 87 |
| 90:10 | 3.6 | 200 | 280 | 87 |
| 80:20 | 1.9 | 195 | 300 | 86 |
| 70:30 | 1.3 | 190 | 300 | 87 |

The tactic vinyl chloride polymer was a copolymer composed of 95% by weight of vinyl chloride units and 5% dichlorethylene units. The K value amounted to 65, and the Vicat temperature was 95° C. 30 parts by weight of diisotridecyl phthalate and, as shown in Table 7, different amounts of a post-chlorinated atactic polyvinyl chloride (chlorine content 68 weight percent, K value 65, Vicat temperature 122° C.) and, as shown in Table 8, different amounts of a chlorinated tactic polyvinyl chloride (chlorine content 66 weight percent, K value 70, Vicat temperature 127° C.) were incorporated. Corresponding results were obtained incorporating a post-chlorinated atactic polyvinyl chloride having a chlorine content of 73 weight percent.

TABLE 7

| x:y | Weight loss in 11 days, 90° C. percent | Tensile strength, kp./cm.² | Elongation, percent | Shore Hardness A, per DIN 53505 |
|---|---|---|---|---|
| 100:0 | 4.8 | 225 | 230 | 96 |
| 95:5 | 2.6 | 240 | 230 | 96 |
| 90:10 | 1.9 | 220 | 240 | 96 |
| 80:20 | 0.8 | 230 | 230 | 97 |
| 70:30 | 0.6 | 230 | 240 | 96 |

TABLE 8

| x:y | Weight loss in 11 days, 90° C. percent | Tensile strength, kp./cm.² | Elongation, percent | Shore Hardness A, per DIN 53505 |
|---|---|---|---|---|
| 100:0 | 4.8 | 225 | 230 | 96 |
| 95:5 | 2.9 | 230 | 220 | 96 |
| 90:10 | 2.1 | 230 | 230 | 96 |
| 80:20 | 0.8 | 240 | 230 | 95 |
| 70:30 | 0.7 | 225 | 240 | 96 |

Corresponding results were obtained incorporating tactic vinyl chloride polymers, which were copolymers of vinyl chloride and 5.5, 9.5 or 13.0% vinylacetate. The K values of said copolymers amounted to 75, and the Vicat temperatures were 85, 83 and 77, decreasing with increasing contents of vinylacetate in said copolymers.

We claim:

1. Molding compound on a basis of plasticized polyvinyl chloride or vinyl chloride copolymers comprising:
   (a) 40 to 75 weight percent of tactic polyvinyl chloride or tactic vinyl chloride copolymer having a comonomer percentage of 0.5 to 20 weight percent and with 55 to 80% of the chlorine atoms thereof in a syndiotactic arrangement having a K value of 55 to 99 and a Vicat temperature of 80–100° C.;
(b) from 20 to 50 weight percent of diisotridecyl phthalate as plasticizer; and
(c) from 5 to 50 weight percent of a chlorine containing polymeric compound selected from the group consisting of post-chlorinated atactic and/or tactic polyvinyl chloride and atactic and/or tactic post-chlorinated vinyl chloride copolymers, the chlorine content of which exceeds that of the polyvinyl chloride or the vinyl chloride copolymer having a K value of 50 to 90 and a Vicat temperature of 85 to 150° C.

2. Molding compound according to claim 1 wherein said plasticizer is present in an amount of from 25 to 40 weight-percent.

3. Molding compound according to claim 1 wherein said chlorine compound (c) is present in an amount of from 15 to 30 weight-percent.

4. Molding compound according to claim 1 wherein said copolymer is a copolymer of vinyl chloride and a member selected from the group consisting of vinyl acetate, vinyl propionate, vinyl stearate, vinylidene chloride, maleic ester, fumaric ester, acrylic ester, itaconic ester, dichlorethylene, trichlorethylene, ethylene and propylene.

5. Molding compound according to claim 1 additionally including a stabilizer.

6. Molding compound according to claim 1 wherein said tactic vinyl chloride polymer is a homopolymer having a K value of 70 and a Vicat temperature of 95° C.

7. Molding compound according to claim 1 wherein said tactic vinyl chloride polymer is a copolymer composed of 95 weight-percent of vinyl chloride units and 5 weight-percent of dichlorethylene units, said copolymer having a K value of 65 and a Vicat temperature of 95° C.

8. Molding compound according to claim 1 wherein said chlorine containing polymeric compound (c) has a chlorine content of 57 to 73 weight-percent.

References Cited

UNITED STATES PATENTS

| | | | |
|---|---|---|---|
| 3,006,889 | 10/1961 | Frey et al. | 260—897C |
| 3,100,762 | 8/1963 | Shockney | 260—899 |
| 3,328,490 | 6/1967 | Buning et al. | 260—899 |
| 3,341,628 | 9/1967 | Buning et al. | 260—899 |

FOREIGN PATENTS 895,153    5/1962    Great Britain.

OTHER REFERENCES

Schildknecht, Calvin E., Vinyl and Related Polymers, John Wiley and Sons, Inc., New York, 1952, p. 412.

MORRIS LIEBMAN, Primary Examiner

J. H. DERRINGTON, Assistant Examiner

U.S. Cl. X.R.

260—899